June 21, 1949. W. LAMPIRIS 2,473,755
INDUCTION CAN SOLDERING MACHINE
Filed Aug. 13, 1945 2 Sheets-Sheet 1

INVENTOR.
WILLIAM LAMPIRIS.
BY John W. Michael
ATTORNEY.

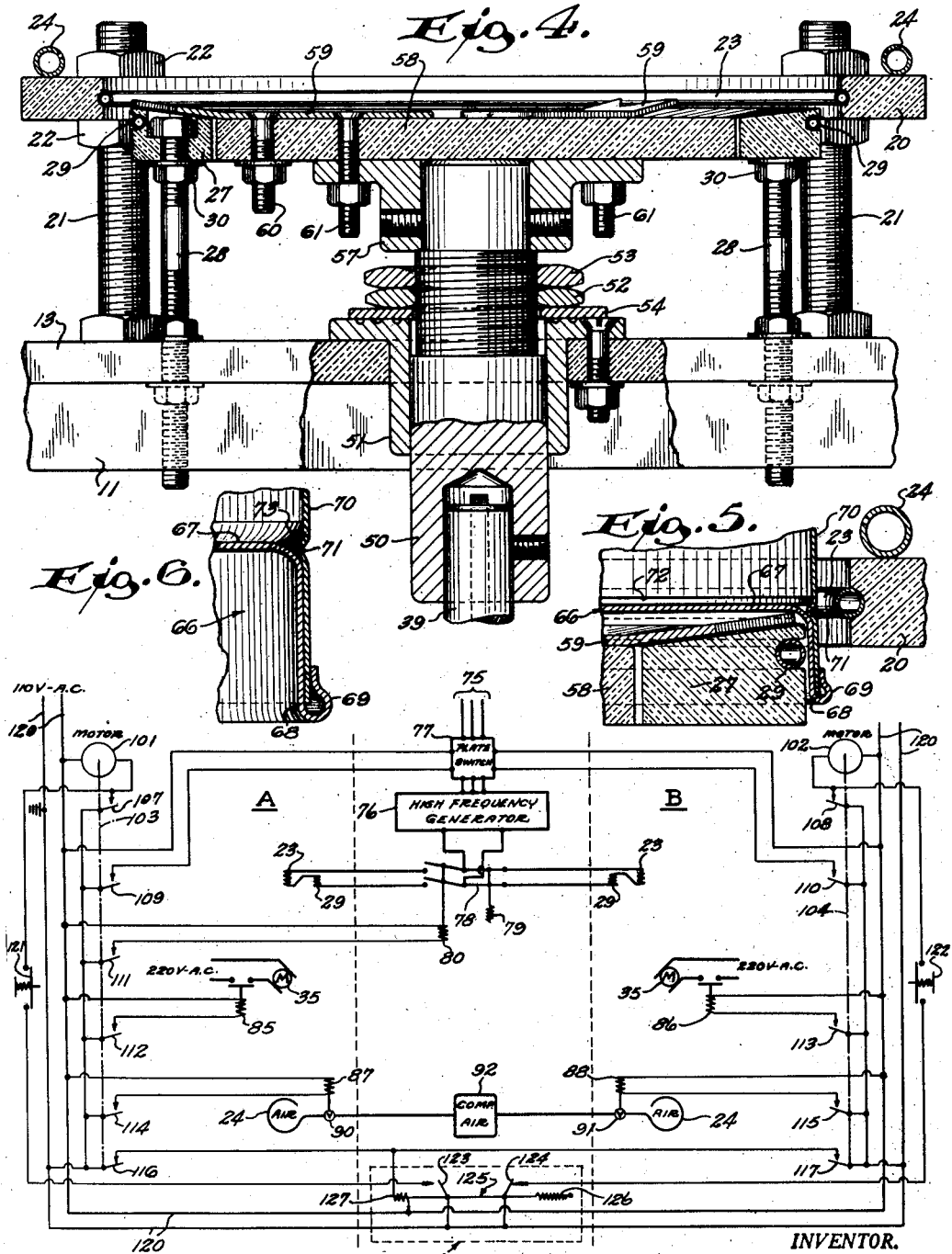

Patented June 21, 1949

2,473,755

UNITED STATES PATENT OFFICE 2,473,755

INDUCTION CAN SOLDERING MACHINE

William Lampiris, Milwaukee, Wis., assignor to Geuder, Paeschke & Frey Co., Milwaukee, Wis., a corporation of Wisconsin Application August 13, 1945, Serial No. 610,543

2 Claims. (Cl. 219—13)

This invention relates to improvements in machines for joining metal parts by low temperature fusion of an alloy or a metal, and particularly to soldering the parts of a vessel which must be kept sanitary at all times.

It is therefore one object of the present invention to provide a machine by which the internally exposed joints between parts of a vessel for containing food are so made as to be, in effect, continuations of the interior surfaces of the parts so that the vessel may be readily kept sanitary at all times.

Another object of the invention is to produce a machine in which localized electric currents are induced in the parts of a metal vessel to be joined by low temperature fusion of the joining metal.

Another object of the invention is to provide a machine for soldering the joints between the parts of a metallic food container in which centrifugal force produces flow of the melted solder to form rounded interior joints.

Another object of the invention is to provide a machine in which the solder to join two metal parts is heated to the melting point while centrifugal force is applied to the parts and in which the centrifugal force is continued while the solder is cooled below the melting point.

Objects and advantages other than those above set forth will be apparent from the following description when read in connection with the accompanying drawings, in which:

Fig. 4 is a fragment, on an enlarged scale, of the structure shown in Fig. 2;

Fig. 5 is a fragment, on an enlarged scale, of the structure shown in Fig. 4 with a portion of the metal container positioned thereon prior to the beginning of the joining operations;

Fig. 6 is an enlarged fragment of a metal container showing the completed joining of the parts thereof; and Fig. 7 is a diagram of the electrical connection for energizing the heating coils and the spinning motor and for controlling the actions of the various elements of the system in a predetermined timed sequence.

Figure 1:
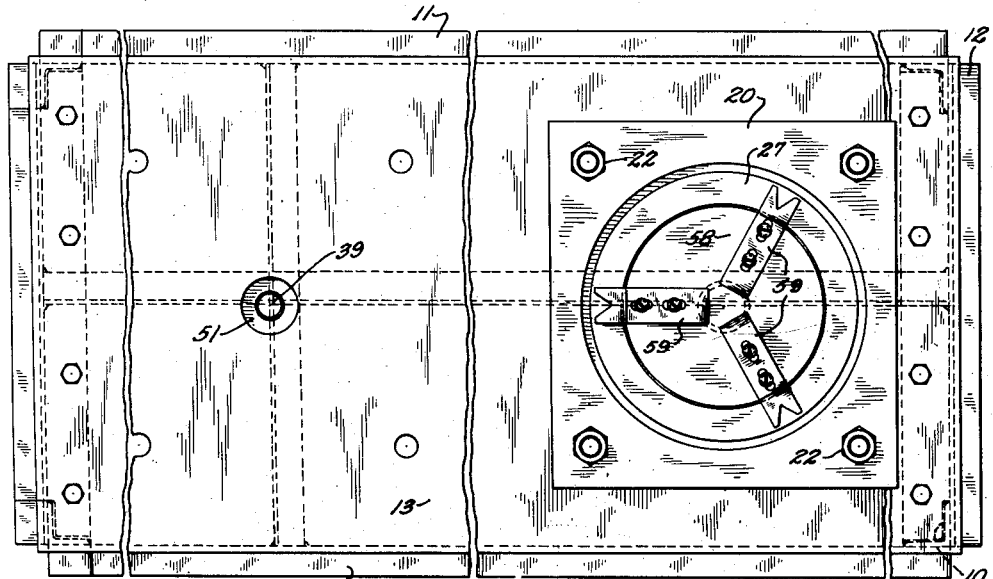
Fig. 1 is a top plan view of a portion of the machine of the present invention with portions thereof broken away and duplicate portions omitted.
Figure 2:
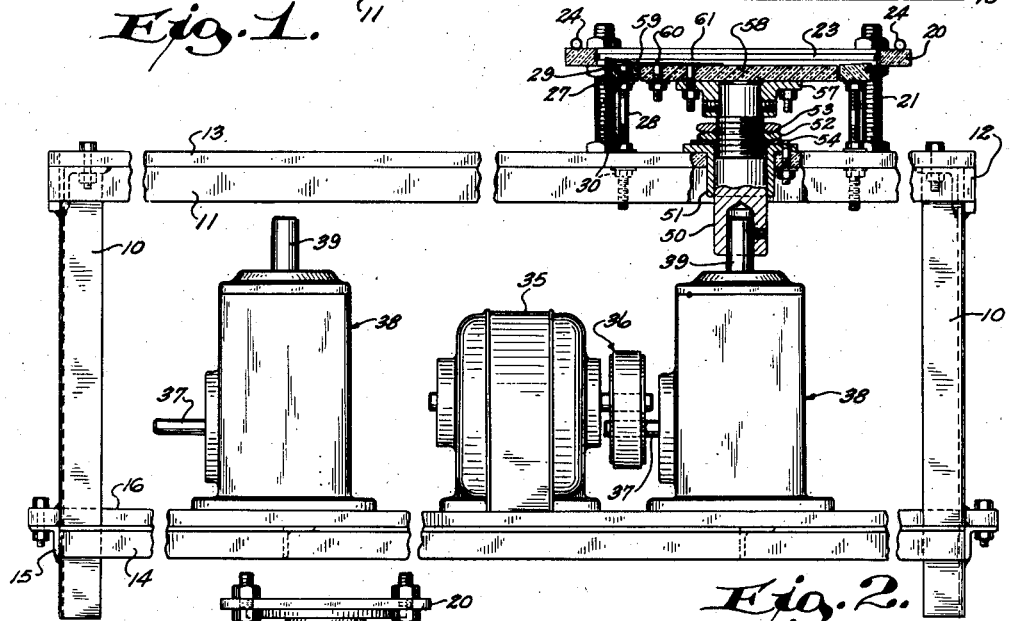
Fig. 2 is a side elevation of the machine with portions broken away and omitting some duplicated parts.
Figure 3:
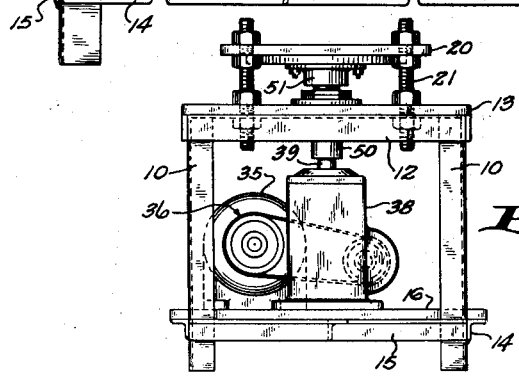
Fig. 3 is an end elevation of the machine.

Referring more particularly to the drawings, the reference numeral 10 designates upright members joined by side members 11 and end members 12 to form a frame on which is mounted a top 13. The uprights 10 are also interconnected below the top 13 by side and end members 14 and 15, respectively, for supporting a shelf 16. The parts above identified form a rigid table-like structure bearing other parts of the machine to be described. The several uprights, side and end members are shown as being structural angles and may be magnetic material, such as iron, unless the electrical losses and heating due thereto require the use of non-magnetic material, as will be apparent from the following description. The top 13 and the shelf 16 are preferably a durable heat and electrical insulating material, such as the known cement and asbestos compositions. Such material, of course, is non-magnetic which is a desirable feature in the present instance.

It will be understood that the parts described hereinafter may be provided in any multiple desired although only two assemblages of such duplicated parts is herein indicated and only one complete structure is herein described. A first frame 20 is mounted on the top 13 in spaced relation thereto, as by bolts 21 extending upwardly from the top and provided with a plurality of nuts 22 by which the spacing of the frame from the top may be adjusted. The outer edge of the frame 20 may be of any desired shape but the frame is made with a circular opening therethrough on which a coil of tubing 23, hereinafter designated as the outer coil, is secured on or in the peripheral edge of such opening. The frame 20 is preferably made of material similar to the top 13, and the supports 21, 22 of the frame are preferably made of non-magnetic material. The coil 23 is made of material of high electrical and heat conductivity and may be at least partially set into the inner peripheral edge of the frame, as shown. A ring-like tube 24 is placed on the frame 20 and is provided with a plurality of holes through the inner surface of such tube for the purpose of directing jets of a fluid into the ring, as will appear hereinafter. Such ring-like tube accordingly acts as a manifold by which a coolant is delivered around the entire periphery of the space defined by the manifold.

A second frame-like member 27, which is annular in form, is mounted within and in spaced relation to the first frame. The second frame 27 is fixed in position, as by bolts 28, securing the frame 27 on and spaced from the table top 13 and in spaced relation to the first frame 20. A second or inner coil 29 of tubing is mounted on or in the circumferential edge of the member 27 in a manner similar to the mounting of the outer coil 23. The material of the member 27 is preferably similar to that of the top 13 and the frame 20, and the material of the coil 29 is similar to that of the coil 23. It will be observed that the second frame 27 and its coil 29 are concentric with but displaced slightly in a vertical direction relative to the first frame 29, the positions of the several frames, relative to each other and to the table top, being adjustable by shifting of nuts on the bolts. The upper surface of the frame 27 is preferably conical or inwardly sloping, for a purpose which will appear hereinafter.

The shelf 16 carries a drive, such as electric motor 35, which is connected by a speed-reducing transmission, such as the belted transmission, generally indicated at 36, with the input shaft 37 of a second speed-reducing transmission generally indicated at 38. The transmission 38 is preferably of the well-known worm and gear type by which a large speed reduction is obtainable between the input shaft 37 and the input shaft 39 of the second transmission. The shaft 39 has an extension 50 mounted in and extending through a steady bearing 51 in an aperture through the table top 13 centrally of the second frame 27. The shaft extension 50 is threaded intermediate its ends to receive a thrust nut 52 locked in place by a nut 53 and riding on a bearing plate 54, the nut 52 and plate 54 forming a thrust bearing for the shaft extension and the parts carried thereby. A hub 57 is secured on the upper end of the shaft 50 and carries a disk 58 on which are fixed a plurality of fingers 59 secured as by bolts 60 and 61 passing through the disk and the disk and hub, respectively.

It will be seen that the structure described immediately above forms a turntable driven by the motor 35 at a speed determined by the additive ratios of the several transmissions 36 and 38. The shaft extension, the bearings therefor, the turntable hub, the fingers and their bolts are preferably made of non-magnetic alloys or metals and the turntable disk is preferably a material similar to that of the table top 13. It will be seen that the fingers 59 extend over the second frame 27, to substantially the circumference thereof, and are slightly spaced above the upper surface of such frame.

The turntable is adapted to receive the several parts of a metal vessel (see Fig. 5) for containing food of which the bottom, generally designated at 66, has a surface 67 forming one wall of the completed vessel. The bottom is flanged down at 68, and reversely flanged at 69, to engage the edge of the container side wall 70. Such side wall is preferably grooved, as indicated at 71, in that portion adjacent the bottom surface 67 when the bottom 66 and the side wall 70 are in the proper relative position to be joined by soldering. A ring of solder 72 is shown in place in the angle or corner formed by the bottom and side wall, and such solder is melted and caused to flow to form a joint, as indicated in Fig. 6 at 73. The solder may be of any desired composition, is preferably flux cored, and is of a cross-sectional size dependent on the size of the can parts to be joined. At present a solder of thirty-five per cent tin and sixty-five per cent lead in a No. 8 wire is used in production, the melting point of such solder being 475° F. It will be understood that the can parts are tinned so that adhesion of the solder is secured as soon as sufficient heat is applied to the can parts and solder.

Any well known type of device, such as either the known rotary generators or electronic generators, may be employed to induce a high frequency electric current in the coils 23 and 29. An interlinking electrical field is formed around such coils which induces an electric current in the metal can parts and the solder when placed within such field. Such induced currents heat up all of the metal parts within the field, the heating being sharply localized in the can parts except for heat transmitted from parts adjacent the coils through the metal to other parts more remote therefrom. The coils 23 and 29 are also heated so that it is desirable to connect the coils to a source of cooling fluid, such as water from any water supply, which is circulated through the coils to prevent sufficient heating thereof to melt the coils. Any suitable compressor is connected to the air manifold 24 to provide a flow of air under the control of a suitable valve for supplying jets of air directed on the can about its entire periphery adjacent the can bottom and side wall joint for the purpose of cooling the solder after flow thereof into the form shown in Fig. 6.

A complete cycle of the operation of the machine and its associated parts is described in the following. The can bottom and the side wall or body are formed and tinned, the bottom flange portions 68 and 69 at that time extending as one flange from the bottom surface 67. The can body is then seated on the bottom to bring the body groove 71 to the position shown relative to the bottom surface 67. The bottom flange portion 69 is then formed over and into contact with the edge of the can body, as by rolling on the die, to produce a uniform shape and size of the angle or corner for receiving the solder ring, the shape and size of such solder angle depending on a number of factors which will appear hereinafter. The solder ring is then placed in the angle and both the can parts to be joined and the solder ring are then preferably preheated to 400-450° F. to reduce the length of time required for the actual soldering operation itself. By using a substantially complete ring of solder, the solder is uniformly distributed throughout the entire angle between the parts to be joined.

The pre-heated cans are then set on the turntable and the motor is started to spin the turntable and can at a speed which may be varied from 90-100 R. P. M., the motor and drive being such that approximately ten seconds are required to come up to speed. High frequency current is then applied to the coils 23 and 29 while the can is spinning to complete heating of the can parts and the solder above the melting point of the solder. In present production, 125 R. F. amperes of 480 k. c. frequency is applied for twenty to twenty-five seconds. During the combined heating and spinning step of the process the solder liquefies and is caused to flow by centrifugal force into the shape shown in Fig. 6 of the drawing.

The high frequency circuit to the coils and the motor circuit are now interrupted and jets of air are applied to the can by way of the manifold 24 while the turntable is still spinning but slowly coming to rest, such slowing down requiring approximately twenty seconds in the case of the motor and drive now in use. The air cools the can and the solder below the melting point of the solder which solidifies in the form shown in Fig. 6. Air of any suitable pressure and temperature may be used, but it has been found that air at thirty pounds pressure and ambient temperatures is satisfactory.

It will be understood that the values above given may be varied, the only requirements being that the turntable be brought up to such speed that the fluid solder will flow into the desired form, that the solder is melted only to such fluidity as to produce the desired flow under the centrifugal force produced, and that the solder be cooled while still under centrifugal force. Hence, the speed, the time intervals, the current values, and the coolant employed will be related to the mass of the can parts and solder and will be varied as such masses are varied. It will be understood that the high frequency current also induces eddy currents in the magnetic metal parts of the table coming within the field of the coils. Hence it is desirable that all metal parts coming within such field be non-magnetic material to avoid current losses and undesirable heating in such parts.

A better understanding of the various steps in the method and the relationships therebetween may be obtained by reference to the diagram of electrical connections shown in Fig. 7 in which symbols representing elements previously illustrated are designated with the same reference numerals as in prior figures. Alternating current is taken from a 220 volt line 75 and is shown as passing through a plate switch 77 to a high frequency generator 76, it being understood that such showing is merely diagrammatic to indicate that the flow of current through the high frequency generator and hence its output may be interrupted by cutting off the plate current as is well known. The high frequency output supplies either of two sets of high frequency coils 23, 29 by way of a double pole double throw switch 78 which is biased by a spring 79 to close one of the coil circuits and is provided with a solenoid 80 for reversing the switch to close the other coil circuit. The motors 35 are also connected with the 220 volt power line through switches shown as severally controlled by solenoids 85 and 86. And the application of air from a suitable source of compressed air 92 is controlled by solenoid-operated valves which are separately designated 90 and 91.

The various solenoids above identified for the two duplicate sides A and B of the machine are severally controlled by the time switches which are interlocked by a device designated 100. Many types of such timers are known and the diagram presented illustrates a timer in which synchronous motors 101—102 drive cam shafts 103—104 by which a plurality of contacts 107—108—109—110, 111, 112—113, 114—115 and 116—117 are opened or closed. Power is supplied to the motors 101—102 by way of a 110 volt alternating current line 120 from which the various solenoids are also energized under the initial control of foot switches 121—122 severally connected with the motors 101—102 and the interlock 100. The interlock comprises a double throw switch 125 biased by a spring 126 to close switch contact 124 and operable to close switch contact 123 upon energization of a coil 127. It will be seen that the above circuits are substantially duplicates for units A and B forming the complete machine above described.

It is assumed that all of the switches are in the positions shown and that contacts 116 are closed which completes a circuit to energize interlock coil 127 and reverse interlock switch 125 from the position shown. A complete cycle of operations then is as follows:

A can, with the solder emplaced and preheated, is set on the turntable of unit A. The foot switch 121 is pressed and completes a circuit through interlock switch contact 123 and through motor 101. The motor rotates sufficiently to close contacts 107 which lock the motor in circuit even though the foot switch automatically opens when released. Contacts 112 are then closed to bring turntable motor 35A up to speed. Contacts 111 are now closed, preferably simultaneously with closure of contacts 112, to connect the high frequency coils 23A, 29A to the high frequency generator. Contacts 109 are then closed to supply current to close the plate switch of the high frequency generator tubes so that high frequency is supplied to the coils 23A, 29A to heat the can and solder to liquefaction so that the solder may be thrown into the shape, shown in Fig. 6, by centrifugal force acting thereon. After a predetermined time contacts 109 and 111 are successively reopened and after a further time interval contact 112 is reopened. The contact 114 is then closed to supply air to the manifold 24A for a given time, after which such contact is reopened and the air is automatically shut off. Contacts 116 are now reopened to deenergize the interlock coil 127 which allows the interlock switch 125 to be pulled back by the spring 126 to the position closing contact 124. It will be understood that the time switch is preferably of such construction that the above mentioned time intervals may be varied as desired and that the contacts 116 may be opened at any time after opening of the contacts 111 and 112.

It is now possible to operate unit B for the reason that interlock switch 125 is back in the position originally shown so that a circuit may now be completed by closing foot switch 122 to energize motor 102. Such motor then closes its holding contacts 108 and the contacts 113 to energize turntable motor 35B. The contacts 110 are then closed to close the plate switch by which current is supplied to the generator tubes. In view of the fact that switch 78 has been returned to the position shown by the spring 79, high frequency current is now supplied to the high frequency coils 23B, 29B. Such high frequency is again supplied for a sufficient period of time to liquefy the solder while the can is rotating and the solder is thrown into the shape shown in Fig. 6. Contacts 110 are then reopened to interrupt the supply of high frequency current to the coils 23B and 29B. Even though contacts 113 are now also reopened, rotation of the motor 35B continues for some time and contacts 115 are now closed to admit air to the manifold 24B by which the solder is cooled below its melting point while the can is still being rotated. After a given interval of time contacts 113 and 115 may be either simultaneously or successively reopened to interrupt the supply of current to the motor 35B and of air to the manifold 24B. The contacts 117 are then closed to complete a circuit to reenergize interlock coil 127 which again changes the position of interlock switch 125 so that the cycle above described for unit A may be repeated.

Although but one embodiment of the present invention has been illustrated and described it will be apparent to those skilled in the art that various changes and modifications may be made

I claim:

1. In a machine for soldering a circular base joint in a can, a turntable mounted for rotation in a substantially horizontal plane and adapted to receive the base of the can, a single-turn stationary inductance heating coil concentric with the axis of rotation of the table and having a greater diameter than the table and positioned above but adjacent to the plane of the top of the table, a second single-turn stationary inductance heating coil concentric with the axis of rotation of the table but being of smaller diameter than the first mentioned coil and located below said first mentioned coil substantially in the plane of the table top, and means for energizing said coils to locally heat that portion of the can disposed between said coils and to melt solder placed on the interior of the can.

2. In a machine for soldering a circular base joint in a can, a turntable mounted for rotation in a substantially horizontal plane and adapted ot receive the base of the can, a single-turn stationary inductance heating coil concentric with the axis of rotation of the table and having a greater diameter than the turntable, an annular frame member disposed substantially exteriorly of the coil and supporting said coil above but adjacent to the plane of the top of the table, another single-turn stationary inductance heating coil concentric with the axis of rotation of the turntable and of lesser diameter than said first mentioned coil, a second annular frame member positioned substantially interiorly of said second mentioned coil and supporting said second mentioned coil substantially in the plane of the top of the table and below said first mentioned coil, and means for energizing said coils to locally heat the parts of the can disposed between said coils and to melt the solder placed on the interior of the can.

WILLIAM LAMPIRIS.

REFERENCES CITED

The following references are of record in the file of this patent:

UNITED STATES PATENTS

| Number | Name | Date |
|---|---|---|
| 1,453,358 | Kettering | May 1, 1923 |
| 1,652,164 | Coyer | Dec. 13, 1927 |
| 1,845,322 | Neuhauss | Feb. 16, 1932 |
| 1,893,380 | Uschman et al. | Jan. 3, 1933 |
| 2,223,312 | Briggs | Nov. 26, 1940 |
| 2,329,944 | Schakenbach | Sept. 21, 1943 |
| 2,341,739 | Olt | Feb. 15, 1944 |
| 2,401,006 | Longoria et al. | May 28, 1946 |
| 2,401,176 | Muller | May 28, 1946 |
| 2,402,509 | Strickland | June 18, 1946 |
| 2,411,439 | Lee | Nov. 19, 1946 |

OTHER REFERENCES

Curtis: "Fixtures facilitate the use of induction heating," "American Machinist," April 13, 1944, page 98.